No. 670,554. Patented Mar. 26, 1901.
J. P. CALDWELL.
COTTON CHOPPER.
(Application filed Jan. 21, 1901.)
(No Model.) 2 Sheets—Sheet 2.
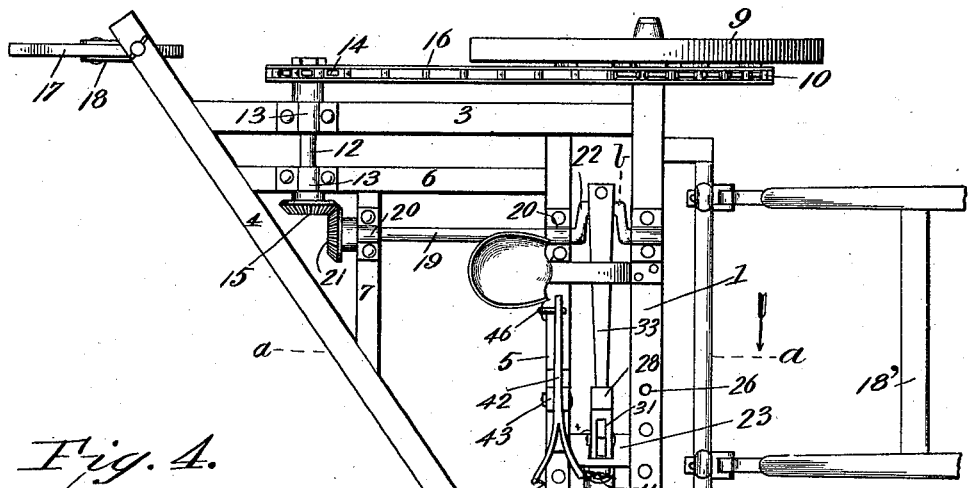
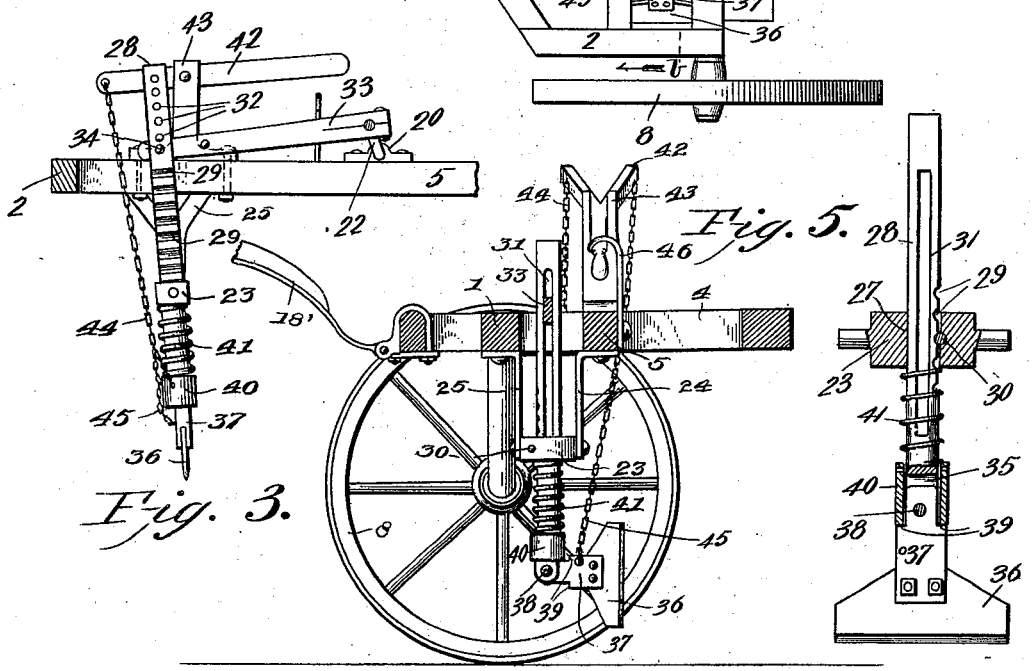
Witnesses
E. H. Walker
J. W. Garner
J. P. Caldwell, Inventor
by C. A. Snow & Co.
Attorneys

UNITED STATES PATENT OFFICE.

JAMES P. CALDWELL, OF HOWARD, GEORGIA, ASSIGNOR OF ONE-HALF TO JAMES R. HUNTER, OF SAME PLACE.

COTTON-CHOPPER.

SPECIFICATION forming part of Letters Patent No. 670,554, dated March 26, 1901.

Application filed January 21, 1901. Serial No. 44,136. (No model.)

*To all whom it may concern:*

Be it known that I, JAMES P. CALDWELL, a citizen of the United States, residing at Howard, in the county of Taylor and State of Georgia, have invented a new and useful Cotton-Chopper, of which the following is a specification.

My invention is an improved cotton-chopper; and it consists in the peculiar construction and combination of devices hereinafter fully set forth and claimed.

The object of my invention is to provide an improved cotton-chopping machine which is adapted to chop at any desired depth in the ridges or rows, to leave the stands at any desired distance apart therein, and to operate between rows of any desired width.

In the accompanying drawings, Figure 1 is a perspective view of a cotton-chopper constructed in accordance with my invention. Fig. 2 is a top plan view of the same. Fig. 3 is a longitudinal sectional view taken on a plane indicated by the line *a a* of Fig. 2. Fig. 4 is a vertical transverse sectional view taken on a plane indicated by the line *b b* of Fig. 2. Fig. 5 is a detail view of the oscillating chopping arm and hoe.

The axle 1 is arched, as shown, and to the same are secured the front ends of side bars 2 3, the latter being longer than the former. An obliquely-disposed bar 4 connects the rear ends of the bars 2 3. The latter are also connected together by a cross-bar 5, which is disposed a suitable distance in rear of the axle. A longitudinally-disposed bar 6 connects the cross-bar 5 and the diagonal bar 4, said bar 6 being disposed parallel with and at a suitable distance from the side bar 3. A cross-bar 7 connects said bar 6 with the bar 4. The axle 1 and bars 2 3 4 5 6 7 constitute the frame of the machine. Supporting and traction wheels 8 9 have their bearings on the spindles of the axle. Said wheel 9 is provided on its inner side with a sprocket-wheel 10, which revolves therewith and in the form of my invention here shown is secured to the spokes thereof by bolts 11. A shaft 12 is journaled in bearings 13 on the bars 3 6. Said shaft has a sprocket-pinion 14 at its outer end and a miter gear-wheel 15 at its inner end. An endless sprocket-chain 16, which has detachable links, so that the same may be lengthened or shortened at will, connects the wheel 10 with the pinion 14, and hence conveys power to the shaft 12, causing the latter to rotate as the machine advances.

A trail-wheel 17 is carried by a fork 18, which is pivotally connected to the rear outer end of the diagonal bar 4, as shown. Said trail-wheel runs in rear of the wheel 9. A pair of shafts 18 are attached to the front side of the frame.

A longitudinally-disposed shaft 19 is journaled in bearings 20 on the axle, the bar 5, and the bar 7. Said shaft has a miter gear-wheel 21 at its rear end, which engages the miter-gear 15 and is provided with a crank 22, which is disposed between the bearings on the axle and bar 5. A rock-shaft 23 is journaled in bearings 24 25, which are respectively bolted to the axle and bar 5 and are adjustable thereon. The said axle and said bar are provided with adjusting bolt-holes 26 for this purpose. Said shaft 23 has an angular slot or opening 27, which extends therethrough and through which passes an oscillating arm or bar 28, which may be secured therein at any desired adjustment. In the form of my invention here shown said oscillating arm or bar is provided with a series of adjusting-openings 29, adapted to be engaged by an adjusting pin or bolt 30, which passes through the opening in rock-shaft 23 to secure the oscillating arm or bar to the rock-shaft at any desired adjustment. In the form of my invention here shown said oscillating arm or bar is provided with a longitudinal slot 31 and with adjusting-openings 32 at right angles to said slot. A pitman 33, which is connected to the crank 22 of shaft 19, is connected also to the said oscillating bar or arm, fitting in the slot 31 thereof and being secured therein at any desired distance from the pivotal center formed by the rock-shaft 23 by the adjusting-openings 32 and a bolt or pin 34. Any other preferred means may, however, be employed for thus connecting the pitman to the oscillating arm or bar to adjust the stroke of the latter. In the lower end of said oscillating arm or bar, parallel with the line of draft, is a slot 35. The chopping-hoe 36 has a shank 37 bolted thereto, which shank is pivoted in the lower end of the oscillating arm or bar 28, as at 38, and is fitted in the said slot. Said shank is further provided with shoulders 39 on opposite sides. It will be understood that the hoe may be extended directly in line with the oscillating arm or bar 28 or turned to a position at right angles thereto, thereby raising the hoe. On the lower portion of the oscillating arm or bar 28 is a locking-sleeve 40, which is adapted when the hoe is extended from the lower end of the said arm or bar, in line therewith, to overlap the joint between the shank of the hoe and the said oscillating arm or bar, engage the shoulders 39, and thereby secure the hoe in operative position. To insure the operation of the locking-sleeve, a spring 41, as here shown, may be provided to bear downward thereon.

A hand-lever 42 is fulcrumed on a standard 43, which is bolted on the upper side of the bar 5. The outer end of said lever is forked, as shown, and to the forks thereof are attached chains 44 45, which are respectively attached to the locking-sleeve and to the shank of the hoe. By depressing the inner end of said lever said chains are caused to simultaneously raise the locking-sleeve to uncover the joint between the arm or bar 28 and the shank of the hoe and to also turn the latter on its pivot 38 and raise the same out of operative position, hence enabling the hoe to be elevated to clear stumps, stones, or other obstructions which may be encountered in the field when the machine is in operation. Any suitable means may be employed for locking the lever 42 in position when the locking-sleeve and chopping-hoe are elevated. As here shown, we provide a hook 46 for this purpose. It will be understood that the chopping-hoe may be of any desired size or shape, and, moreover, that a series of chopping-hoes of varying sizes may be interchangeably used, according to the desired width between the "stands" of cotton-plants in the rows.

The operation of my invention will be readily understood. By adjusting the oscillating bar or arm 28 vertically in the rock-shaft 23, which carries it, the chopping-hoe may be caused to operate at any desired depth in the soil which forms the ridges or rows, and by adjusting the pitman in said oscillating arm or bar the stroke of the chopping-hoe may be increased or diminished at will. The rapidity of the stroke of the chopping-hoe may be regulated by employing a series of interchangeable sprocket-pinions 14 of varying diameters and correspondingly lengthening or shortening the sprocket-chain 16.

Having thus described my invention, I claim—

1. In a cotton-chopper, the combination of a supporting-frame, a rock-shaft journaled therein, an oscillating arm or bar adjustable in said rock-shaft and having a chopping-hoe, a counter-shaft having a crank, a pitman connecting said crank and said oscillating arm or bar and adjustable on the latter to regulate the stroke thereof and means to rotate said counter-shaft, substantially as described.

2. In a cotton-chopper, the combination of an oscillating bar, a chopping-hoe pivotally connected thereto and adapted to be extended therefrom in line therewith and to be swung to any desired angle with relation thereto, a locking-sleeve adapted to overlap the joint between said hoe and bar and means to raise and lower said locking-sleeve and said chopping-hoe, substantially as described.

In testimony that I claim the foregoing as my own I have hereto affixed my signature in the presence of two witnesses.

JAMES P. CALDWELL.

Witnesses:
 F. B. MONTFORT,
 L. R. ADAMS.